United States Patent [19]

Ebisawa et al.

[11] Patent Number: 4,688,153
[45] Date of Patent: Aug. 18, 1987

[54] CHARGE TRANSFER COMPLEX

[75] Inventors: Makoto Ebisawa; Shuko Shindo; Kenichi Hashizume; Isao Isa, all of Shibukawa, Japan

[73] Assignee: The Japan Carlit Co., Ltd., Tokyo, Japan

[21] Appl. No.: 930,317

[22] Filed: Nov. 12, 1986

[30] Foreign Application Priority Data

Nov. 18, 1985 [JP] Japan ............................ 60-256617

[51] Int. Cl.$^4$ ............................................ H01G 9/05
[52] U.S. Cl. ................................. 361/433; 252/62.2
[58] Field of Search .............. 361/433, 314, 315, 319; 252/62.2

[56] References Cited

U.S. PATENT DOCUMENTS 3,709,820  1/1973  Yoshimura et al. ............... 252/62.2
3,872,358  3/1975  Murakami et al. ................. 361/433
4,580,855  4/1986  Niwa ............................... 361/433 E

FOREIGN PATENT DOCUMENTS 2113916  8/1983  United Kingdom .
2153148  8/1985  United Kingdom .

OTHER PUBLICATIONS

L. R. Melby et al, J. Am. (Hem Soc. 84 (1962)), 3374.

Primary Examiner—Donald A. Griffin
Attorney, Agent, or Firm—Frishauf, Holtz, Goodman & Woodward

[57] ABSTRACT

A charge transfer complex having excellent electrical conductivity and thermal stability is obtained by employing an isoquinoline substituted by an amyl radical at its N-position as a donor and 7,7,8,8-tetracyanoquinodimethane as an acceptor. In the process for preparation of said charge transfer complex, amyliodide and isoquinoline are reacted with each other in an organic solvent or no solvent and the product obtained by the reaction is reacted with 7,7,8,8-tetracyanoquinodimethane in an organic solvent. Also disclosed is a solid electrolytic capacitor which employs said charge transfer complex as an electrolyte.

8 Claims, 8 Drawing Figures

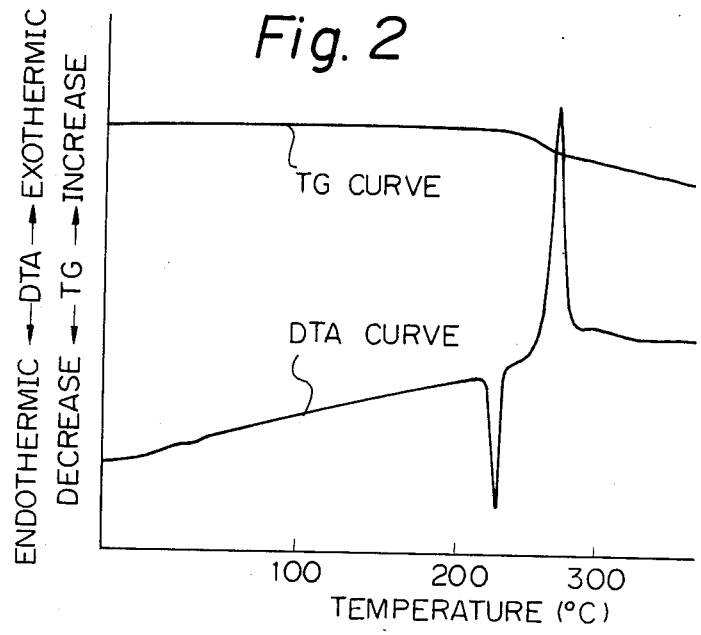
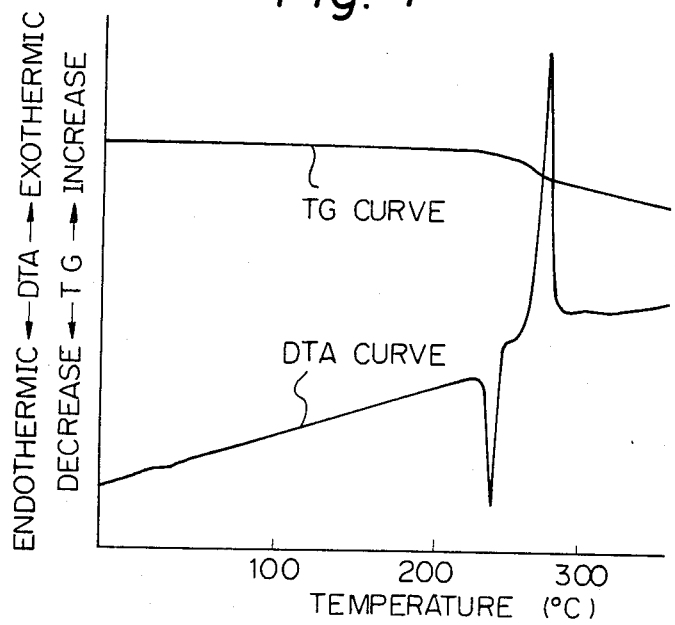

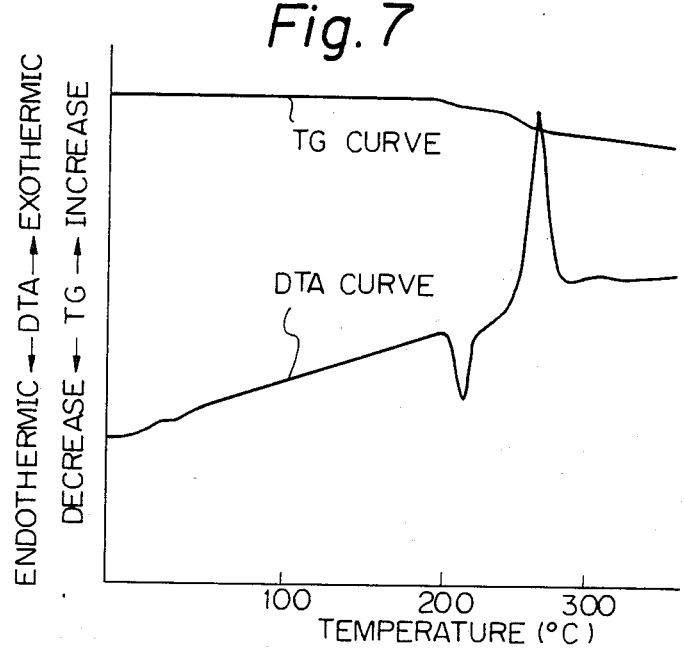
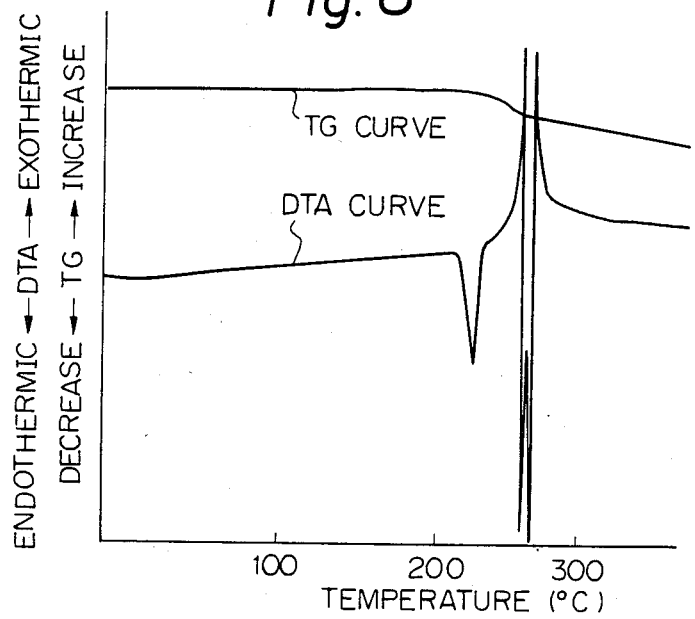

CHARGE TRANSFER COMPLEX

BACKGROUND OF THE INVENTION

1. Field of the Invention

The present invention relates to a novel organic charge transfer complex which is excellent in both electrical conductivity and thermal stability, and to a process for preparation thereof. The present invention also pertains to a solid electrolytic capacitor employing said charge transfer complex.

2. Description of the Related Art

Electrically conductive organic charge transfer complexes are increasingly being put to practical use in many fields as, for example, materials capable of imparting electrical conductivity to general-purpose polymers, semiconductor devices, electrolytes for batteries, anode active materials for batteries, antistatic agents, heat sensitive materials, photoconductive materials, display devices, solid electrolytes for capacitors, etc. Conventional electrically conductive organic charge transfer complexes have useful properties characteristic to organic matter which are not found in metals, but are inferior in both electrical conductivity and thermal stability and it has therefore been desired that they be improved in respect of these properties.

Development of digital devices in recent years has given rise to a demand for large-capacity capacitors which have excellent high-frequency characteristics, i.e., relatively low impedance in the high-frequency region, and studies have been made to apply the above-described complexes to this field.

Examples of known capacitors which have excellent high-frequency characteristics include thin-film, mica and ceramic capacitors. These conventional capacitors, however, involve the problem that, when they are designed to obtain an electrostatic capacity of 1 $\mu$F or more, their sizes are increased, and the production costs are also raised considerably.

Electrolytic capacitors, which are known to be large-capacity capacitors, include two types, that is, the liquid electrolyte type in which a liquid electrolyte is impregnated, and the solid electrolyte type in which manganese dioxide is employed as a solid electrolyte. The former type of electrolytic capacitor, which employs an electrolyte in a liquid state, utilizes ion conduction, and therefore resistance remarkably increases in the high-frequency region, so that the impedance of the capacitor increases disadvantageously. The latter type of electrolytic capacitor employs as a solid electrolyte manganese dioxide which is obtained by thermally decomposing manganese nitrate since manganese dioxide is an insoluble solid substance. This type of electrolytic capacitor also has relatively high impedance in the high-frequency region partly because manganese dioxide has a relatively high specific resistance, and partly because it is subjected to thermal decomposition to obtain manganese dioxide, and the oxide film thereof is readily damaged.

In order to overcome the above-described disadvantages of the conventional capacitors, one type of electrolytic capacitor which employs as a solid electrolyte a charge transfer complex consisting of a combination of 7,7,8,8-tetracyanoquinodimethane (hereinafter referred to as TCNQ) and a donor has already been proposed.

Examples of the donor employed in the proposed TCNQ charge transfer complex include N-n-hexylquinoline, N-ethylisoquinoline, N-n-butylisoquinoline (see Japanese Patent Public Disclosure No. 191414/1983), N-n-propylisoquinoline and N-isopropylisoquinoline (see Japanese Patent Public Disclosure No. 17609/1983).

However, the conventional TCNQ charge transfer complex which may be composed of the above-described compounds suffers from inferior thermal stability and therefor involves a risk of the complex being decomposed during the capacitor manufacturing process such as to become an insulator. This prior art is also unsatisfactory in terms of electrical conductivity.

SUMMARY OF THE INVENTION

In view of the above-described circumstances, it is a first object of the present invention to provide an organic charge transfer complex which is excellent in both electrical conductivity and thermal stability.

It is a second object of the present invention to provide an electrolytic capacitor designed to have characteristics superior to those of the conventional capacitors by employing said charge transfer complex as an electrolyte for the capacitor.

Other objects and advantages of the present invention will become apparent to those skilled in the art from the following description and disclosure.

DETAILED DESCRIPTION OF THE DRAWINGS

FIGS. 2 and 4 show the measurement results of thermogravimetry (TG) and differential thermal analysis (DTA) of the charge transfer complex of the present invention; and FIGS. 5-8 show the measurement results of TG and DTA of conventional charge transfer complexes.

DETAILED DESCRIPTION OF THE PREFERRED EMBODIMENT

Figure 1:
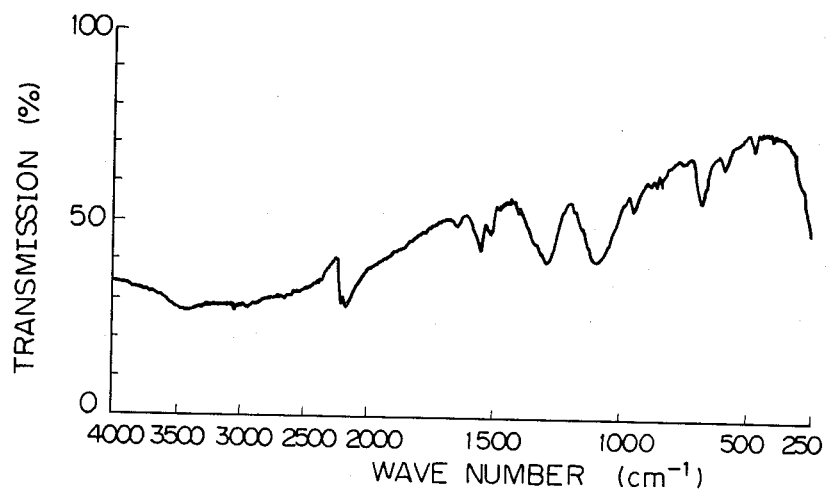
FIGS. 1 and 3 show an infra-red spectrum of the charge transfer complex of the present invention.

The present inventors made exhaustive studies with a view to attaining the above objects and have found that the above-described disadvantages of the prior art can be overcome by a charge transfer complex comprising an isoquinoline substituted by an amyl radical at its N-position as a donor and TCNQ as an acceptor, and a capacitor having this complex as an electrolyte has particularly excellent characteristics. The present invention has been accomplished on the basis of this finding.

Examples of the amyl radical employed in the present invention include n-amyl, isoamyl, sec-amyl, active amyl and tert-amyl. Among these amyls, n-amyl and isoamyl are particularly preferable. Although the molar ratio of the acceptor to the donor of generally known charge transfer complexes is 1 or 2, the molar ratio of TCNQ to an isoquinoline substituted by an amyl radical at its N-position of the complex according to the present invention should be between 0.9 and 3.0, preferably between 0.9 and 2.2.

The following is a description of the process for synthesizing the charge transfer complex according to the present invention.

Corresponding amyliodide and isoquinoline are reacted with each other at a temperature between room temperature and a reflux temperature in an organic solvent or in no solvent under a pressure of 0.2 to 2 kg/cm$^2$ to introduce the corresponding amyl radical to the N-position of the isoquinoline, thereby obtaining a donor. Among said organic solvents, alcoholic solvent is particularly preferable. Then this donor and TCNQ are reacted with each other in an organic solvent, preferably acetonitrile at a temperature between room temperature and a reflux temperature under a pressure of 0.2 to 2 kg/cm² to obtain the charge transfer complex according to the present invention.

The thus obtained charge transfer complex of the present invention is dissolved into an organic solvent to prepare an impregnating solution, and an anode material is dipped in the solution for impregnation. Thereafter, the organic solvent is evaporated to form a complex layer on the surface of the anode material, thereby obtaining a capacitor unit. Alternatively, the complex is impregnated into a portion defined between two electrodes of an unit consisting of anode and cathode materials, and is then cooled to obtain a capacitor unit having the complex attached thereto, this capacitor unit being incorporated into a casing member or the like to obtain a solid electrolytic capacitor.

The charge transfer complex of the present invention, which comprises an isoquinoline substituted by an amyl radical at its N-position as a donor and TCNQ as an acceptor, is improved remarkably in both electrical conductivity and thermal stability compared with the conventional electrically conductive organic charge transfer complexes. Furthermore, the charge transfer complex of the subject invention can be advantageously put to practical use in may fields as materials capable of imparting electrical conductivity to polymers, semiconductor devices, electrolytes for batteries, anode active materials for batteries, antistatic agents, heat sensitive materials, photoconductive materials, display devices, solid electrolytes for capacitors, etc. In particular, the capacitors in which the charge transfer complex of the subject invention is incorporated are excellent in both high-frequency characteristics and thermal characteristics.

The present invention will be explained more specifically below by way of Examples. However, the present invention is in no way restricted to these Examples.

EXAMPLE 1

To 15.3% of n-amyliodide and 10 g of isoquinoline placed in a four-necked flask equipped with a reflux condenser and mechanical stirrer was added 30 ml of ethanol. The mixture was reacted for 3 hours under reflux. When the reaction was completed, ethanol was removed from the reaction mixture under reduced pressure, the residue was washed 2-times with 45 ml of ethyl ether. 23.5 g of N-n-amylisoquinolinium iodide was obtained as yellow crystals. Subsequently, into a four-necked flask equipped with a reflux condenser and mechanical stirrer was placed 8 g of TCNQ and 280 ml of acetonitrile, and the TCNQ was dissolved in the acetonitrile under reflux. To the flask was added a solution of 9.6 g of N-n-amylisoquinolinium iodide in 40 ml of acetonitrile. The mixture was reacted for 20 minutes under reflux. The reaction mixture was cooled to 5° C., and separated black needles were filtered out and washed 2-times with 100 ml of methanol. 10.6 g of charge transfer complex of N-n-amylisoquinolinium TCNQ was obtained. The complex was adequately crushed by an agate mortar, and pressed in a metal mold (13 mm$^\phi$) under 1 t (0.75 t/cm²) for 5 minutes. Silver paste electrodes were applied on both sides of the pellet and dried at 100° C. for 30 minutes. The specific resistance was measured at 120 Hz and 10 mV at 20° C. It was 2.8 Ωcm.

The intra-red spectrum of the complex was shown in FIG. 1. The results of thermogravimetry (TG) and differential thermal analysis (DTA) are shown in FIG. 2. The measurements of TG and DTA were carried out using 5.7 mg of a sample in an open aluminum case at a heating rate of 15° C./min. under ambient pressure.

As shown in FIG. 2, the melting point of the charge transfer complex of N-n-amylisoquinolinium TCNQ was 215° C., the temperature at the start of weight loss was 235° C. and the exothermic decomposition temperature was 258° C.

EXAMPLE 2

Figure 3:
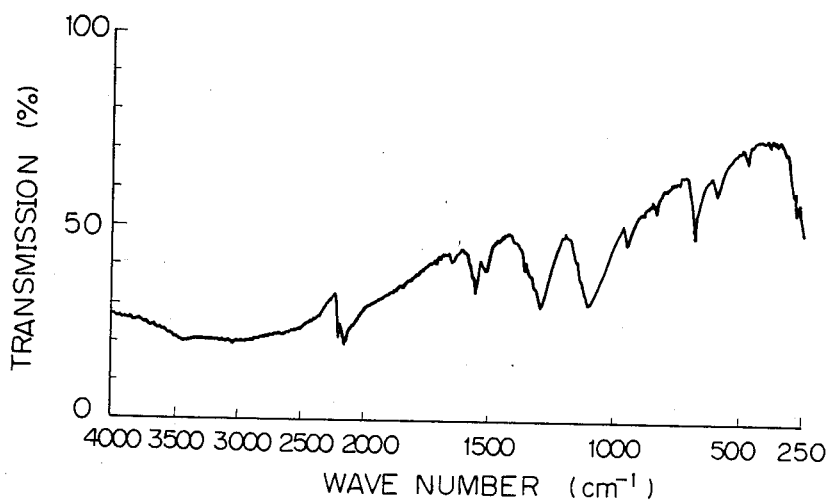

To 15.3 g of isoamyliodide and 10 g of isoquinoline placed in a four-necked flask equipped with a reflux condenser and mechanical stirrer was added 30 ml of ethanol. The mixture was reacted for 3 hours under reflux. When the reaction was completed, ethanol was removed from the reaction mixture under reduced pressure, the residue was washed 2-times with 45 ml of ethyl ether. 23.0 g of N-isoamylisoquinolinium iodide was obtained as yellow crystals. Subsequently, into a four-necked flask equipped with a reflux condenser and mechanical stirrer was placed 8 g of TCNQ and 280 ml of acetonitrile, and the TCNQ was dissolved in the acetonitrile under reflux. To the flask was added a solution of 9.6 g of N-isoamylisoquinolinium iodide in 40 ml of acetonitrile, and the mixture was reacted for 20 minutes under reflux. The reaction mixture was cooled to 5° C., separated black needles were filtered out and washed 2-times with 100 ml of methanol. 10.4 g of charge transfer complex of N-isoamylisoquinolinium TCNQ was obtained. The infra-red spectrum of the complex was shown in FIG. 3. The specific resistance of the complex measured by the same method as that described in Example 1 was 3.6 Ωcm.

The results of TG and DTA measured by the same method as that described in Example 1 are shown in FIG. 4. As shown in FIG. 4, the melting point of the charge transfer complex of N-isoamylisoquinolinium TCNQ was 227° C., the temperature at the start of weight loss was 234° C., and the exothermic decomposition temperature was 262° C.

Comparative Example 1

Figure 5:
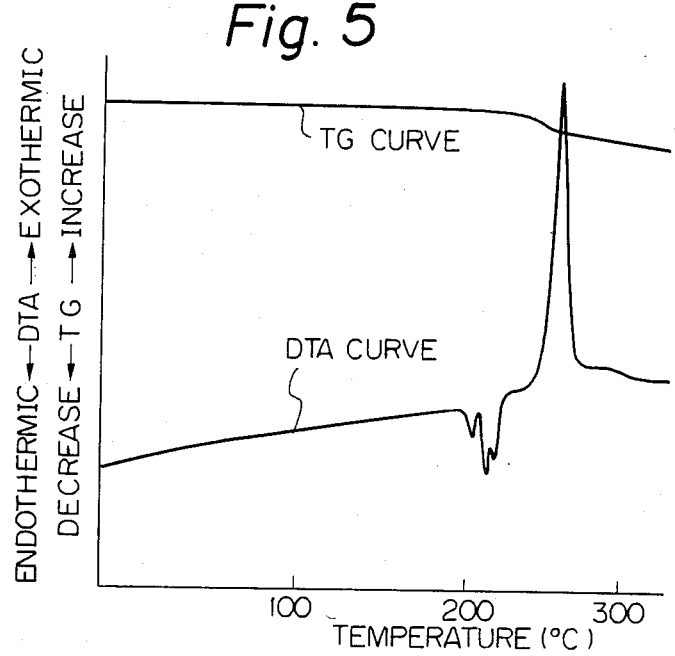

N-n-propylisoquinolinium TCNQ complex was prepared in accordance with Example 1 except that n-amyliodide was replaced by n-propyliodide. The measurements of specific resistance, TG and DTA were carried out by the same methods as those described in Example 1. The results of TG and DTA are shown in FIG. 5, and the others in Table 1.

Comparative Example 2

Figure 6:
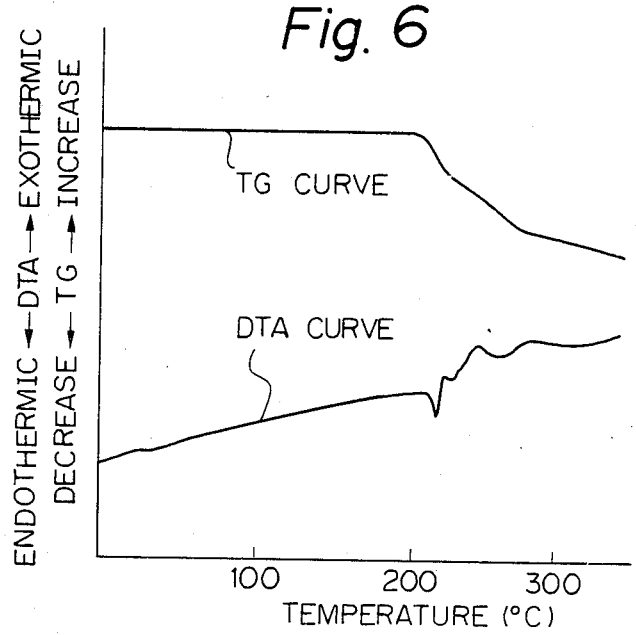

N-sec-butylisoquinolinium TCNQ complex was prepared in accordance with Example 1 except that n-amyliodide was replaced by sec-butyliodide. The measurements of specific resistance, TG and DTA were carried out by the same methods as those described in Example 1. The results of TG and DTA are shown in FIG. 6, and the others in Table 1.

Comparative Example 3

N-n-hexylisoquinolinium TCNQ complex was prepared in accordance with Example 1 except that n-amyliodide was replaced by n-hexyliodide. The measurements of specific resistance, TG and DTA were carried out by the same methods as those described in Example 1. The results of TG and DTA are shown in FIG. 7, and the others in Table 1.

Comparative Example 4

N-b-butylisoquinolinium TCNQ complex was prepared in accordance with Example 1 except that n-amyliodide was replaced by n-butyliodide. The measurements of specific resistance, TG and DTA were carried out by the sample methods as those described in Example 1. The results of TG and DTA are shown in FIG. 8, and the others in Table 1.

TABLE 1

| | Radicals | Specific resistance ($\Omega$cm) | Melting point (°C.) | Weight loss starting temperature (°C.) | Exothermic decomposition temperature (°C.) |
|---|---|---|---|---|---|
| Ex. 1 | n-amyl | 2.8 | 215 | 235 | 258 |
| Ex. 2 | iso-amyl | 3.6 | 227 | 234 | 262 |
| Comp. Ex. 1 | n-propyl | 22.6 | 200 | 208 | 244 |
| Comp. Ex. 2 | sec-butyl | 11.1 | 206 | 208 | Causing decomposition together with fusion |
| Comp. Ex. 3 | n-hexyl | 60.1 | 198 | 202 | 242 |
| Comp. Ex. 4 | n-butyl | 91.7 | 211 | 228 | 250 |

The physical properties of charge transfer complexes consisting of isoquinolinium donor with the carbon number of the substituent at N-position being varied from 3 to 6 are summarized in Table 1. This table indicates that the complexes containing amyl group have particularly low specific resistance (high conductivity), a high melting point, a high weight loss staring temperature, and a high decomposition temperature and, therefore, have superior thermostability.

EXAMPLE 3

Into an aluminum case (6.3 mm$\phi$) was charged 60 mg of the complex obtained in Example 1, and this was heated to melt. A winding type aluminum electrolyte capacitor unit was then impregnated with the melted complex and immediately cooled to obtain a capacitor unit. This capacitor unit has its aluminum surface coated with an oxide film by chemical conversion treatment and was then used. The characteristics of the obtained capacitor are shown in Table 2.

EXAMPLE 4

The experiment of Example 3 was repeated except that the complex obtained in Example 1 was replaced by the complex obtained in Example 2. The characteristics of the obtained capacitor are shown in Table 2.

Comparative Example 5

The experiment of Example 3 was repeated except that the complex obtained in Example 1 was replaced by the complex obtained in Comparative Example 1. The characteristics of the obtained capacitor are shown in Table 2.

Comparative Example 6

The experiment of Example 3 was repeated except that the complex obtained in Example 1 was replaced by the complex obtained in Comparative Example 2. The characteristics of the obtained capacitor are shown in Table 2.

Comparative Example 7

The experiment of Example 3 was repeated except that the complex obtained in Example 1 was replaced by the complex obtained in Comparative Example 3. The characteristics of the obtained capacitor are shown in Table 2.

TABLE 2

| | | 20° C. | | | 85° C. | | |
|---|---|---|---|---|---|---|---|
| | Radicals | Cap ($\mu$F) | tan $\delta$ (%) | ESR (m$\Omega$) | Cap ($\mu$F) | tan $\delta$ (%) | $\Delta$C/C (%) |
| Ex. 3 | n-amyl | 15.05 | 1.94 | 45.4 | 16.02 | 2.79 | 6.45 |
| Ex. 4 | iso-amyl | 15.12 | 2.15 | 50.4 | 15.95 | 2.60 | 5.47 |
| Comp. Ex. 5 | n-propyl | 14.95 | 3.80 | 310 | 16.59 | 3.59 | 10.97 |
| Comp. Ex. 6 | sec-butyl | 3.29 | 30.97 | 1870 | 4.82 | 28.51 | 46.50 |
| Comp. Ex. 7 | n-hexyl | 11.82 | 6.64 | 122 | 16.74 | 9.93 | 41.62 |

In Table 2, Cap means electrostatic capacity at 120 Hz, tan $\delta$ means dielectric loss tangent at 120 Hz, ESR means equivalent series resistance at 100 kHz, $\Delta$C/C means percent of capacity change between 85° C. and 20° C.

As shown in Table 2, Example 3 and Example 4 have both low tan $\delta$ and low ESR compared to Comparative Examples 5 to 7. Thus, the characteristics of this capacitor are superior. Furthermore, the $\Delta$C/C is low, which means that the capacity change ratio caused by temperature change is small. Thus, it is clear that the thermal characteristics of this capacitor are superior.

We claim:

1. A charge transfer complex comprising: an isoquinoline substituted by an amyl radical at its N-position as a donor and 7,7,8,8-tetracyanoquinodimethane as acceptor, the molar ratio of the acceptor to the donor of the charge transfer complex being between 0.9 and 3.0.

2. The charge transfer complex according to claim 1, wherein said molar ratio is between 0.9 and 2.2.

3. The charge transfer complex according to claim 1, wherein said amyl radical is selected from the group consisting of normal amyl radical and isoamyl radical.

4. A process for preparation of a charge transfer complex comprising the steps of:
(a) reacting amyliodide and isoquinoline to react with each other in an organic solvent under reflux or in the absence of solvent; and
(b) reacting the product obtained by said reaction and 7,7,8,8-tetracyanoquinodimethane to react with each other in an organic solvent under reflux.

5. The process according to claim 4, wherein the reaction between amyliodide and isoquinoline is carried out in the absence of solvent.

6. The process according to claim 4, wherein the solvent used for the latter reaction (step b) is acetonitrile.

7. A solid electrolytic capacitor comprising:
a charge transfer complex as an electrolyte which has an isoquinoline substituted by an amyl radical at its N-position as a donor and 7,7,8,8-tetracyanoquinodimethane as an acceptor.

8. The solid electrolytic capacitor according to claim 7, wherein said amyl radical is selected from the group consisting of normal amyl radical and isoamyl radical.

* * * * *